(12) United States Patent
Von Keitz (10) Patent No.: US 11,054,072 B2
(45) Date of Patent: Jul. 6, 2021

(54) COUPLING DEVICE FOR COUPLING LINES FOR THE OUTSIDE

(71) Applicant: Andreas Von Keitz, Diez (DE)

(72) Inventor: Andreas Von Keitz, Diez (DE)

( * ) Notice: Subject to any disclaimer, the term of this patent is extended or adjusted under 35 U.S.C. 154(b) by 0 days.

(21) Appl. No.: 16/345,121

(22) PCT Filed: Oct. 26, 2017

(86) PCT No.: PCT/EP2017/077490
§ 371 (c)(1),
(2) Date: Apr. 25, 2019

(87) PCT Pub. No.: WO2018/078036
PCT Pub. Date: May 3, 2018

(65) Prior Publication Data
US 2019/0285211 A1     Sep. 19, 2019

(30) Foreign Application Priority Data
Oct. 26, 2016    (DE) .......................... 102016120446.3

(51) Int. Cl.
*F16L 27/10* (2006.01)
*F16L 27/02* (2006.01)
(Continued)

(52) U.S. Cl.
CPC ......... *F16L 27/1012* (2013.01); *F16L 27/026* (2013.01); *F16L 27/12* (2013.01);
(Continued)

(58) Field of Classification Search
CPC ..... F16L 27/1012; F16L 27/026; F16L 27/12; F16L 29/04; F16L 29/007; F16L 55/1015; B63B 27/34
See application file for complete search history.

(56) References Cited

U.S. PATENT DOCUMENTS

| 3,031,213 A | 4/1962 | Bruning et al. |
|---|---|---|
| 3,458,219 A | 7/1969 | Wesch |

(Continued)

FOREIGN PATENT DOCUMENTS

| CN | 104937321 A | 9/2015 |
|---|---|---|
| CN | 104968984 A | 10/2015 |

(Continued)

OTHER PUBLICATIONS

Authorized Officer: dall'Amico, Mauro, International Search Report issued in PCT application No. PCT/EP2017/077490, dated Jan. 16, 2018, 4 pp.

(Continued)

*Primary Examiner* — Kenneth Rinehart
*Assistant Examiner* — Patrick C Williams
(74) *Attorney, Agent, or Firm* — Kaplan Breyer Schwarz, LLP (57) ABSTRACT

A coupling device for joining two lines has two coupling parts that are coupled and connected together in the axial direction to connect the two lines to each other, and wherein the two coupling parts are fixed to each other via a plurality of spring-loaded coupling elements distributed in the circumferential direction of the coupling device, such that the two coupling parts are operable to be bent relative to each other with respect to a normal position by forces acting laterally with respect to the axial direction of the coupling device, and wherein the coupling elements in the bent position exert a restoring force on the coupling parts in the direction of the normal position by the spring load.

18 Claims, 7 Drawing Sheets

(51) Int. Cl.
*F16L 27/12* (2006.01)
*F16L 29/04* (2006.01)
*F16L 55/10* (2006.01)
*F16L 29/00* (2006.01)
*B63B 27/34* (2006.01)

(52) U.S. Cl.
CPC ........... *F16L 29/04* (2013.01); *F16L 55/1015* (2013.01); *B63B 27/34* (2013.01); *F16L 29/007* (2013.01)

(56) References Cited

U.S. PATENT DOCUMENTS

| | | | |
|---|---|---|---|
| 3,495,853 | A | 2/1970 | Furrer |
| 3,851,900 | A | 12/1974 | Camboulives et al. |
| 4,317,586 | A | 3/1982 | Campbell |
| 4,361,165 | A | 11/1982 | Flory |
| 5,967,193 | A * | 10/1999 | Nagai .................... F01N 1/006 138/110 |
| 9,249,911 | B2 * | 2/2016 | Ikeda .................... F16L 27/026 |
| 2011/0012343 | A1 * | 1/2011 | Gutierrez-Lemini ........................ E21B 17/085 285/223 |

FOREIGN PATENT DOCUMENTS

| | | |
|---|---|---|
| DE | 2344327 A1 | 3/1974 |
| DE | 102013100483 A1 | 7/2014 |
| EP | 3258157 A1 | 12/2017 |
| WO | 2008/059668 A1 | 5/2008 |
| WO | 2014/111278 A1 | 7/2014 |
| WO | 2014/111279 A1 | 7/2014 |
| WO | 2016/129605 A1 | 12/2017 |

OTHER PUBLICATIONS

Office Action issued in Chinese patent application No. 201780066905.0 dated Jul. 17, 2020 and English Translation thereof.
Communication issued in EP Patent Application No. 17797107.4 dated Jun. 2, 2020.

* cited by examiner

COUPLING DEVICE FOR COUPLING LINES FOR THE OUTSIDE

FIELD

The invention relates generally to line couplings, especially those for use in outdoor areas.

BACKGROUND

Such couplings must meet special requirements for mechanical strength compared to connectors for indoor areas, for example. Special requirements arise in couplings intended for use in water, for example for the offshore sector. Either these couplings must withstand a high hydrostatic pressure under water, or else the couplings are exposed to the sea state. Especially the sea state brings recurring mechanical load peaks with it. These may then lead to fatigue over time, so that the coupling undesirably separates.

SUMMARY

The object of the invention is therefore to provide a coupling which is particularly suitable for use under changing, laterally acting mechanical loads, such as those caused by sea state.

This object is achieved by the subject matter of the independent claims. Advantageous further developments are specified in the dependent claims. A basic idea of the invention is to provide not a rigid connection of the two lines to be connected, but to create some flexibility between the coupling parts despite an aligned coupling. Specifically, a coupling device is provided for joining together or connecting two lines, wherein the coupling device has two coupling parts which are coupled together and connected to each other for establishing a connection of the two lines in the axial direction, and wherein the two coupling parts are fixed to each other via a plurality of spring-loaded coupling elements distributed in the circumferential direction of the coupling device such that the two coupling parts are operable to be bent relative to one another with respect to a normal position by forces acting laterally in relation to the axial direction or longitudinal direction, and wherein the coupling elements exert a restoring force on the coupling parts in the direction of the normal position by the spring load in an kinked position.

The coupling elements of the coupling device thus absorb transverse forces, or forces acting laterally with respect to the longitudinal direction, by the springs of the coupling elements being loaded when the coupling device is bent, thereby absorbing mechanical energy.

The coupling device may constitute a permanent connection of the two lines. In particular, however, it is also possible to provide a coupling device which provides a separable connection. In this case, the two lines may be separated from each other by releasing the connection of the two coupling parts, wherein one of the coupling parts remains at each end of the lines. In general, according to this further aspect of the invention, a coupling device is provided for joining two lines which has two coupling parts operable to be detachably coupled together and connected to each other in the axial direction to produce a connection of two lines, wherein the connection of the coupling parts is sealed from the environment with at least one seal, and wherein the two coupling parts are held together with a plurality of spring-loaded coupling elements distributed in the circumferential direction of the coupling device such that the two coupling parts are operable to be moved apart or bent against spring forces acting via the spring loading until the coupling elements decouple after exceeding a certain travel, so that the coupling parts are able to separate, wherein the two coupling parts are bendable until separation by a bending angle of at least 0.5°, in the further development of the invention are even bendable by at least 1°. A bendability by at least 0.5°, preferably at least 1°, may also be provided in a coupling device having permanently interconnected, or non-detachably interconnected, coupling parts.

Particularly preferably, at least one of the coupling parts, preferably the coupling device in the coupled together state of the two coupling parts, is capable of floating in water.

By virtue of the coupling being able to float, the lines coupled together or a line half with coupling part that has fallen into the water are easily accessible. On the other hand, there is the problem that the sea state then exerts constantly changing forces on the lines and, thus, also on the coupling. In order to absorb the loads caused thereby, the coupling mechanism is flexible, thanks to the spring-loaded coupling elements, and allows a certain degree of bending movement to avoid the mechanical stress without the coupling parts separating.

BRIEF DESCRIPTION OF THE DRAWINGS

The invention will be described in more detail below with reference to the accompanying figures. In the figures.

DETAILED DESCRIPTION

Figure 1:
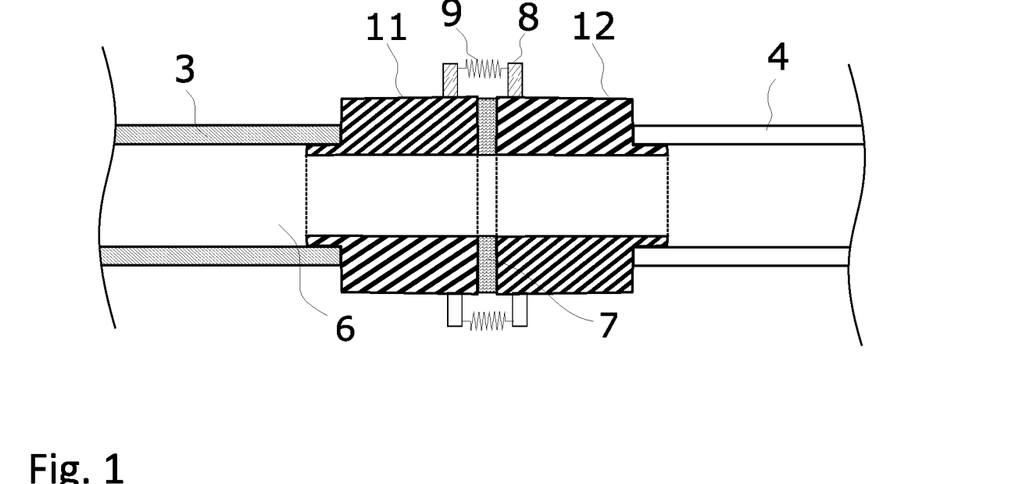
FIG. 1 shows a coupling device in the normal position.
Figure 2:
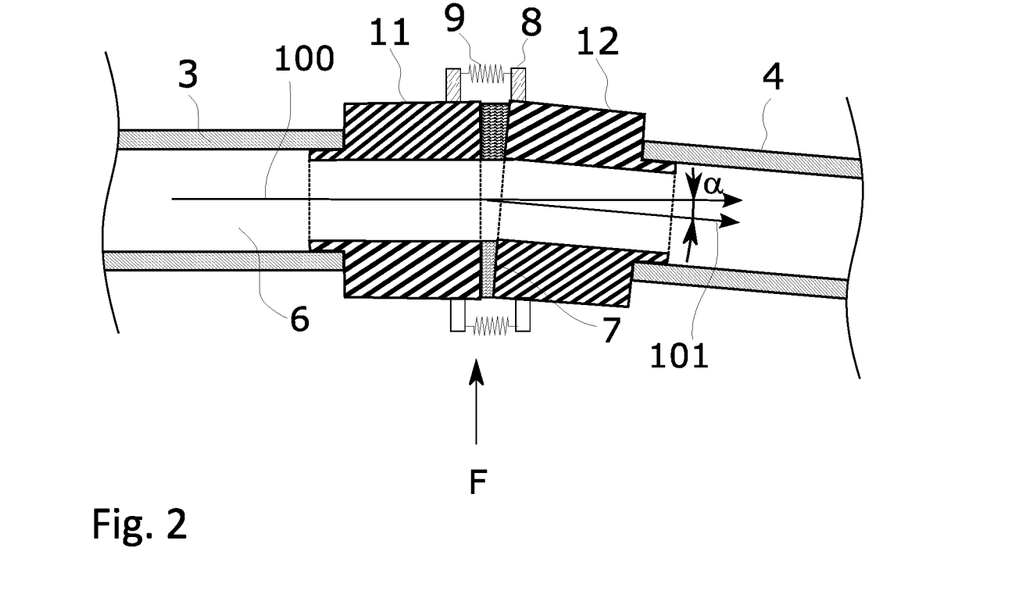
FIG. 2 shows a coupling device under the effect of a transverse force.

FIG. 1 shows a coupling device 1 according to the invention in a basic embodiment. The coupling device 1 comprises two coupling halves, or coupling parts 11, 12. With the coupling device 1, two lines 3, 4 are joined together, so that a fluid is able to flow through the lines, or from one line into the other. The lines are coupled to one another, in particular in the axial direction 100. The axial direction 100 extends in the longitudinal direction of the lines or, accordingly, also in the direction of fluid flow through the lines. The coupling device 1 has a plurality of coupling elements 8 distributed in the circumferential direction or distributed around the fluid channel 6 formed by the lines 3, 4 coupled together. The coupling elements 8 are spring-loaded, so that they are expandable in the axial direction of the coupling device 1. For this purpose, the coupling elements 8 are equipped with spring elements 9. With the coupling elements 8, the two coupling parts 11, 12 are fixed to each other. The coupling device 1 is now designed so that the two coupling parts 11, 12 are bendable relative to one another in relation to a normal position by forces acting laterally with respect to the axial direction of the coupling device 1. FIG. 1 shows the coupling device 1 in said normal position. Shown in FIG. 2 are such a force F acting laterally or transversally with respect to the axial direction 100 and the coupling device 1 in a bent position. Force F has produced an angle α between the axial directions 100, 101 of the coupling parts 11, 12 relative to the normal position. In order to ensure the sealing of the fluid channel 6 even in a bent state, a deformable connecting element 7 may be provided between the two coupling parts 11, 12.

The spring elements 9 of the coupling elements 8 absorb the transverse force and thus ensure a flexible connection of the two lines 3, 4. As a result, abruptly occurring and strong lateral forces and bending moments are absorbed, so that the coupling device is less mechanically stressed when there are movements of the line connection, such as in outdoor areas, for example in the case of a sea state in offshore applications. The spring load in the position shown in FIG. 2 also provides for a restoring torque with which the coupling parts 11, 12 are reset back to the normal position with attenuated transverse force.

Figure 3:
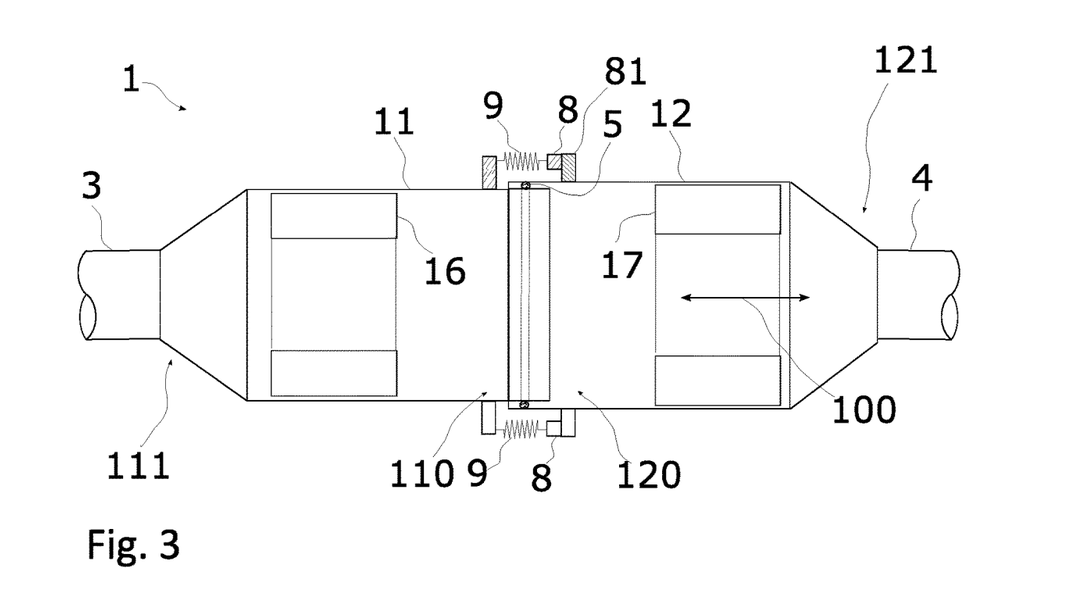
FIG. 3 schematically shows a coupling device having two coupling parts coupled together.

FIG. 3 shows the basic structure of a coupling device 1 according to the invention according to a further development of the invention. The coupling device shown here is provided for the releasable connection of two lines. The coupling device 1 comprises two coupling halves, or coupling parts 11, 12, with which a connection of two lines 3, 4 is produced. This connection should be reversibly releasable, so that the lines 3, 4 may be repeatedly connected to each other. Depending on the application, the coupling device according to the invention may generally be designed for connecting two fluid, power or signal lines 3, 4. Likewise, lines 3, 4 formed as line bundles, for example, with a plurality of parallel fluid lines, or bundles having at least one fluid line and one power cable may also be connected to one another.

The connection is made in the axial direction 100 of the coupling parts 11, 12. Each of the coupling parts 11, 12 has a coupling end 110, or 120, by which the coupling parts 11, 12 are connected to each other, and an opposite terminal end 111, 121 for connecting the respective line 3, 4. The axial direction is also defined by the longitudinal directions of the lines 3, 4. A tensile stress on the lines 3, 4 thus leads to a tensile force acting in the longitudinal direction 100 of the coupling device 1.

The coupling device 1 in the coupled together state of the two coupling parts 11, 12 is buoyant in water. Preferably, without limitation to the specific example illustrated, each of the coupling parts 11, 12 is buoyant per se. In order to produce the buoyancy of at least one of the coupling parts 11, 12, the coupling part may have at least one buoyancy body. Preferably, as also shown in the example of FIG. 3, both coupling parts 11, 12 are equipped with at least one buoyancy body 16, 17. A preferred construction material for the coupling device 1 is metal. Especially in this case, buoyancy bodies or cavities are useful to enable the buoyancy of the coupling device 1 and/or the coupling parts 11, 12. The buoyancy body or bodies 16, 17 may also be mountable on the outside of the respective coupling part 11, 12 in order to assist the buoyancy of one or both of the coupling parts 11, 12.

To seal the interior of the coupling, the connection of the coupling parts 11, 12 is sealed from the environment with at least one seal 5.

A plurality of coupling elements 8 is provided that are spring-loaded in the coupled together state of the two coupling parts 11, 12 with one or more spring elements 9 and as a result the coupling parts are pressed against each other in the axial direction 100 and thereby held together. Advantageously, the coupling elements 8 are distributed over the circumference of the coupling device 1. Thus, the force exerted by the one or more spring elements 9 is divided over the circumference of the coupling device 1. The coupling elements 8 are fastened in the shown example to one of the coupling parts (in this case coupling part 11) via the spring elements 9 and engage abutments 81 on the other coupling part 12. The coupling mechanism is purely symbolic in FIG. 3. A possible and preferred connection of the coupling elements 8 will be further discussed below. However, there are also other options. For example, abutment 81 and coupling element 8 could be connected to each other by magnetic forces.

The connection with the coupling elements 8, by contrast, is not rigid, so that the forces acting on the coupling elements due to wave action or other movements—such as when the floating coupling device 1 impacts, for example, a pier or a ship's hull—may be partially cushioned. In general, without being limited to the illustrated example, according to the invention the two coupling parts 11, 12 are operable to be moved apart or bent against spring forces acting via the spring load. In the case of a detachable coupling, as in the case of FIG. 5, the coupling elements 8 are able to decouple after exceeding a certain travel, so that the coupling parts 11, 12 are able to separate. Preferably, the two coupling parts 11, 12 may be bent up to an angle of at least 0.5° before they separate without the coupling elements 8 releasing the connection of the coupling parts 11, 12.

Figure 4:
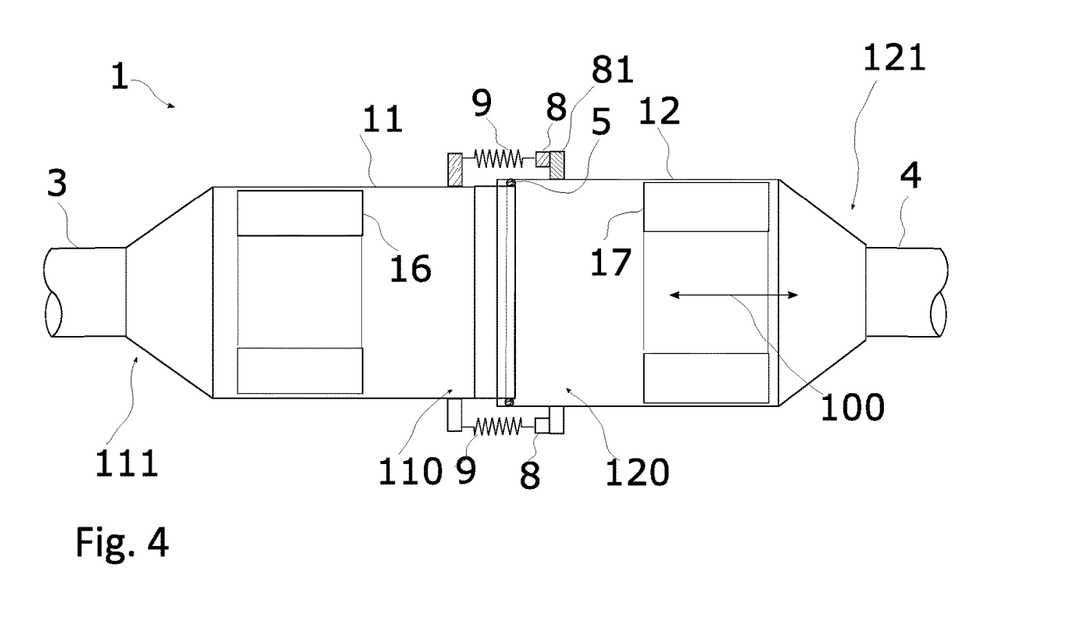
FIG. 4 shows the coupling device shown in FIG. 3, under axial tensile loading.

FIG. 4 shows a first load state of the coupling device 1, in which a tensile force is acting in the axial direction. The two coupling parts 11, 12 are moved slightly away from each other by the applied force, and the spring elements 8 are further tensioned compared to the state shown in FIG. 3. Accordingly, the tensile force acts against the force exerted by the spring elements 9, which pulls the two coupling parts 11, 12 together.

Figure 5:
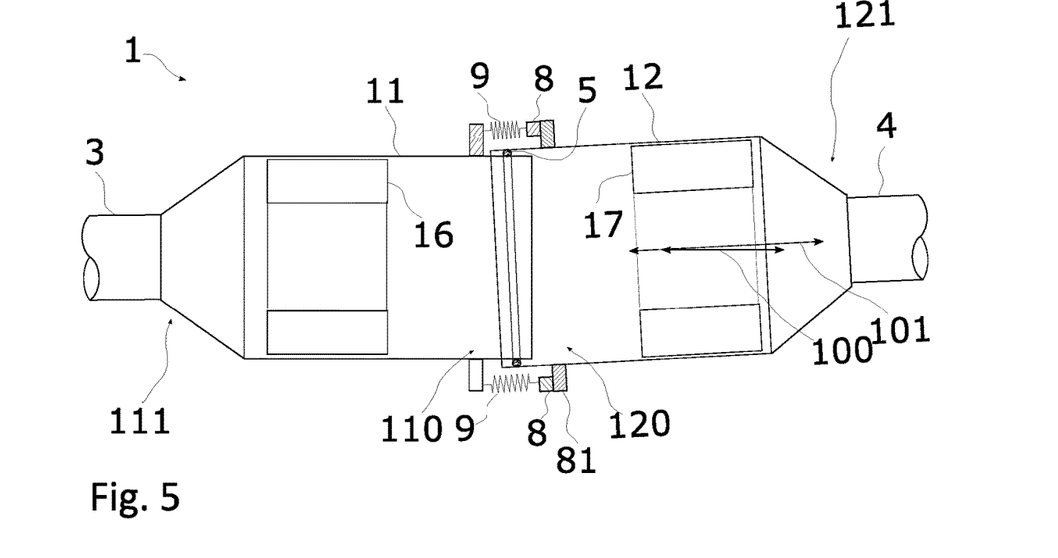
FIG. 5 shows the coupling device shown in FIG. 3 loaded with a bending moment.

FIG. 5 shows another case particularly relevant to the purpose of the invention. In the state shown in FIG. 5, the two coupling parts 11, 12 are bent relative to each other by a force acting laterally, or transversely to the longitudinal direction. The longitudinal direction 101 of the coupling part 12 thus has an angle relative to the longitudinal direction 100 of the remaining coupling device 1, in particular also the longitudinal direction of the other coupling part 11.

In both cases, that is to say the case of an elongation shown in FIG. 4 and the case of a bending shown in FIG. 5, the coupling elements 8 still couple the two coupling parts to one another. Also, the seal 5 maintains the sealing of the interior of the coupling parts from the environment despite bending or elongation.

Figure 6:
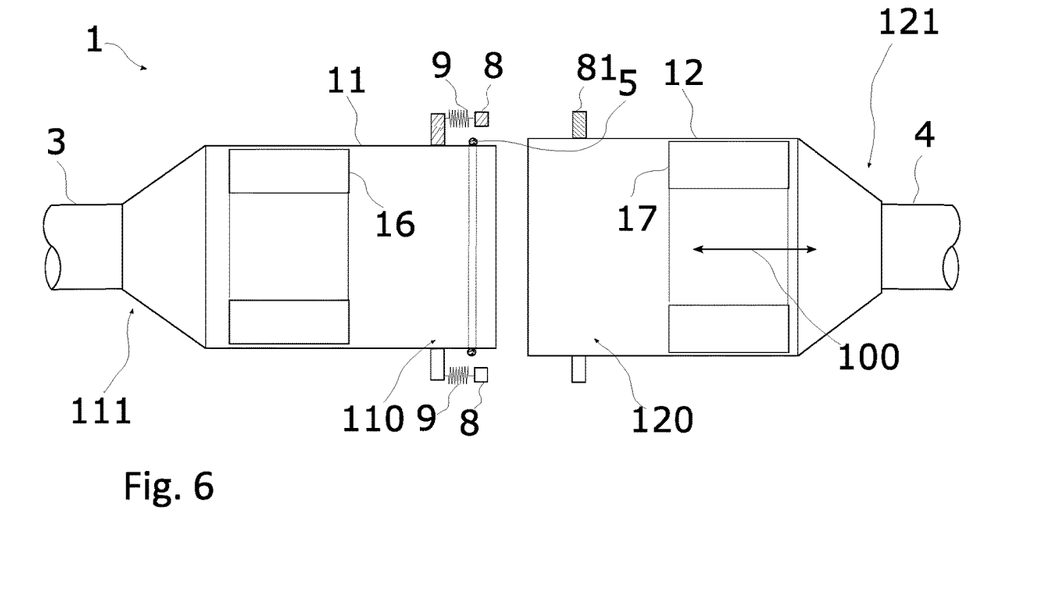
FIG. 6 shows the coupling parts separated from one another after excessive stretching or bending movement.

After a certain travel is exceeded, the coupling elements 8 decouple, that is, they detach from the abutments 81, so that the coupling parts (11, 12) separate. This condition is shown in FIG. 6. In the coupled together state, the spring elements 9 are preferably under tension even without externally acting forces, so that the coupling parts are pressed against each other. Accordingly, even in the separated state according to FIG. 6, the spring elements 9 are then contracted relative to the coupled together state shown in FIG. 3. The reverse case is also possible, in which the spring force for pressing together the coupling parts is achieved not by expansion, but by a compression of one or more spring elements 9.

Up to the decoupling of the coupling parts 11, 12 shown in FIG. 6, they may be tilted against each other by an angle of at least 0.5° by an external bending moment. In the example shown in FIG. 5, the angle is about 3°.

Figure 7:
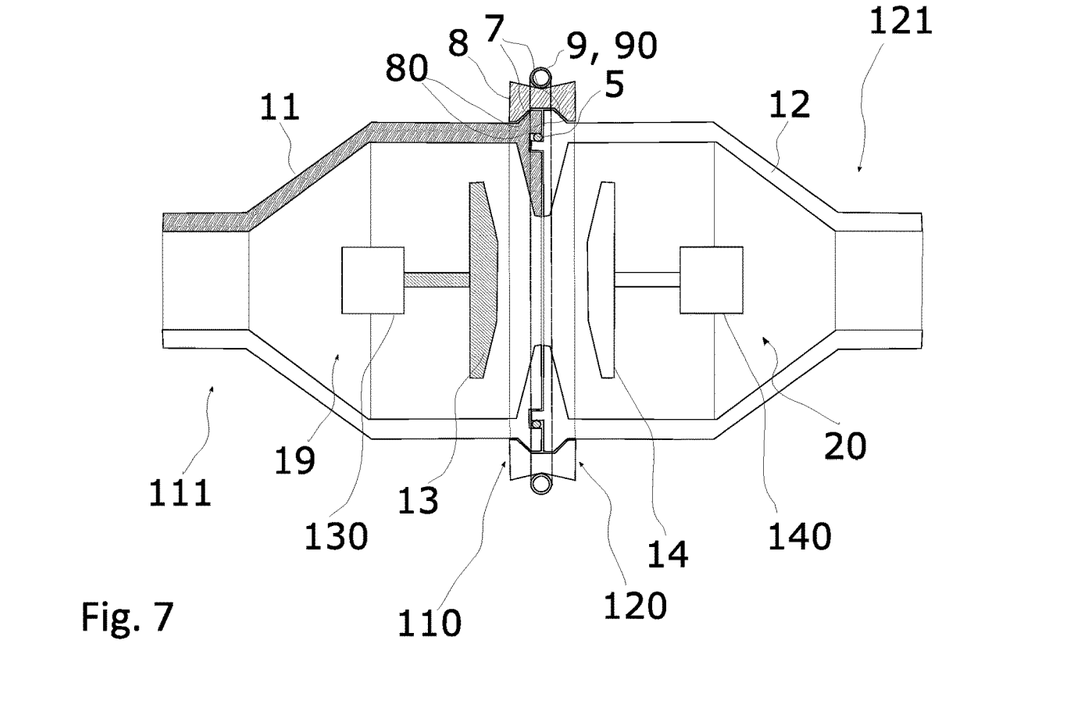
FIG. 7 shows an embodiment of the invention having mutually corresponding inclined surfaces on coupling element and coupling part.

FIG. 7 shows an embodiment of the invention with a specific design of the coupling elements 8. This embodiment of the coupling device 1 is based on the fact that at least one of the coupling parts 11, 12 has at least one coupling surface 7 running inclined with respect to the axial direction 100 of the coupling device 1 and circumferentially distributed, spring-loaded coupling elements 8, which in the coupled state of the coupling parts are in contact with one or more of these inclined coupling surfaces 7. The coupling elements 8 are movable in the radial direction against the spring load. The inclined coupling surface 7 causes radially acting forces of the spring load to be converted into axially acting forces that hold the two coupling parts 11, 12 together at the coupling ends 110, 120. The coupling parts 11, 12 are bendable here by a force acting transversely with respect to the axial direction against the radially acting spring load by the coupling element 8 being moved in the radial direction against the spring load.

In particular, as is also the case with the example shown in FIG. 7, both coupling parts 11, 12 may be equipped with inclined coupling surfaces 7.

The spring element 9 comprises, according to an embodiment that is advantageous due to its structurally simple design, an annular, expandable spring element, or an expandable or extensible spring washer 90. The spring forces acting in the radial direction are produced by the spring element being impressed by the spreading of a contraction force acting in the circumferential direction. Such a spring washer may also be used in conjunction with coupling elements 8 which are of different design than the embodiment shown in FIG. 7. For example, rotatably mounted, lever-shaped coupling elements 8 could also be provided that are clamped together by a spring washer 90.

According to yet another embodiment of the invention, the coupling elements 8 may also have surfaces 80 corresponding to the coupling surface 7 and inclined with respect to the axial direction 100, so that in an axial separation movement of the coupling parts 11, 12 and a thereby imparted radial movement of a coupling element 8, the corresponding surfaces of coupling element and the coupling surface 7 slide past each other. This further development is also implemented in the example shown in FIG. 7. In particular, inclined surfaces 80 corresponding to the inclined surfaces 7 of the two coupling parts 11, 12 are also provided on the coupling elements 8. The inclined surfaces 80 of the coupling elements 8 are facing each other, so that the coupling parts 11, 12 are clamped together.

The two coupling parts 11, 12 each have, according to a particularly preferred embodiment of the invention, a cavity 19, 20, which is open toward the coupling end 110, 120, and a sealing device 13, 14. The sealing device 13, 14 is in each case designed so that it seals the cavity 19, 20 from the environment during the separation of the coupling parts 11, 12. In the embodiment shown in FIG. 7, the sealing devices 13, 14 are formed as poppet valves. Each of the coupling parts 11, 12 may have a drive means 130, 140 in order to actuate the sealing devices 13, 14 and thus to seal the respective cavity 19, 20. The drive means 130, 140 may, for example, be hydraulic or pneumatic actuators to move the poppet valves to seal the cavity 19, 20 in the valve seats. Also possible is a mechanism in which the poppet valves are held open against biased springs as part of the drive means 130, 140. Drive and pressing against the valve seats is then effected when the springs separate the coupling parts.

A remotely operable decoupling mechanism may also be provided with which the coupling elements 8 are radially movable until they decouple from the coupling surfaces 7 and the coupling parts 11, 12 separate. By means of such a mechanism, the drive devices 130, 140 may then also be moved simultaneously in order to separate the coupling parts 11, 12.

According to an alternative or additional embodiment, the coupling device 1 may also be designed as a safety disconnect coupling which disconnects when a predetermined mechanical tensile load limit is exceeded, in order to prevent the connected lines 3, 4 from rupturing.

Figure 8:
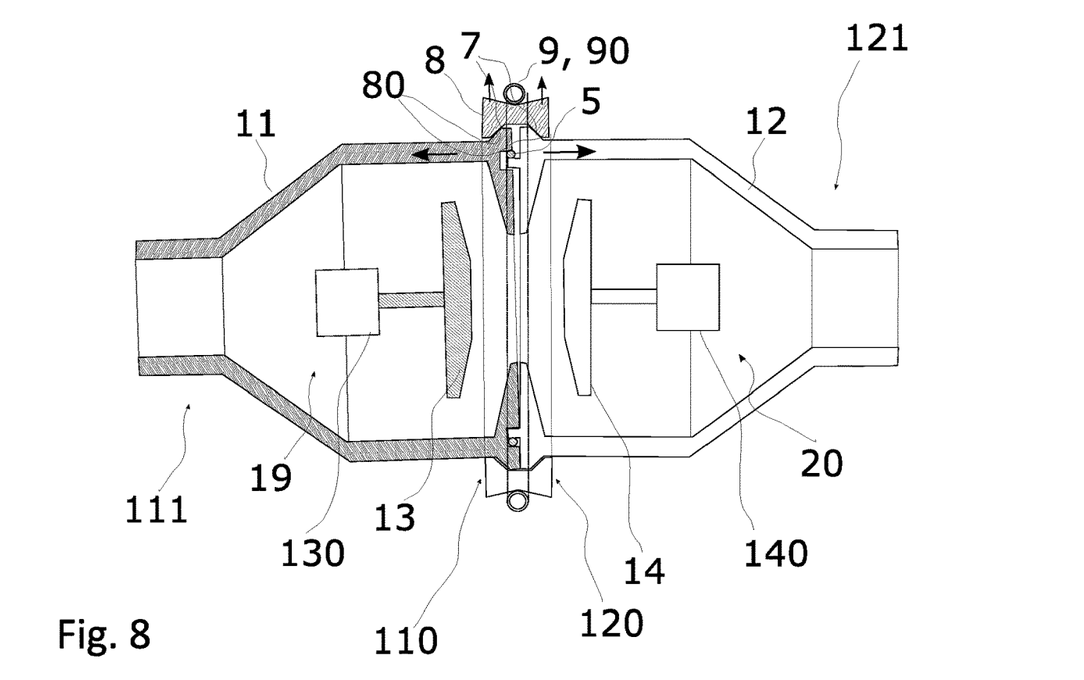
FIG. 8 shows the coupling device shown in FIG. 7 loaded with a bending moment.

FIG. 8 shows the coupling device according to FIG. 7 under a load transverse to the longitudinal direction. The two coupling parts 11, 12 are moved apart by the load on one side, so that the axial directions of the coupling parts 11, 12 are no longer aligned, but at an angle to each other. The separation movement of the coupling parts 11, 12 is indicated by the arrows. The coupling element 8 is moved radially outwardly by the inclined surfaces 7 sliding past the surfaces 80 at the point at which the coupling parts 11, 12 are moved apart by the acting bending moment. However, the coupling parts 11, 12 are still connected and the common interior formed by the mutually open cavities 19, 20 is still sealed by means of the seal 5. The bending angle between the two coupling parts 11, 12 in the example shown is about 1.5°.

Figure 9:
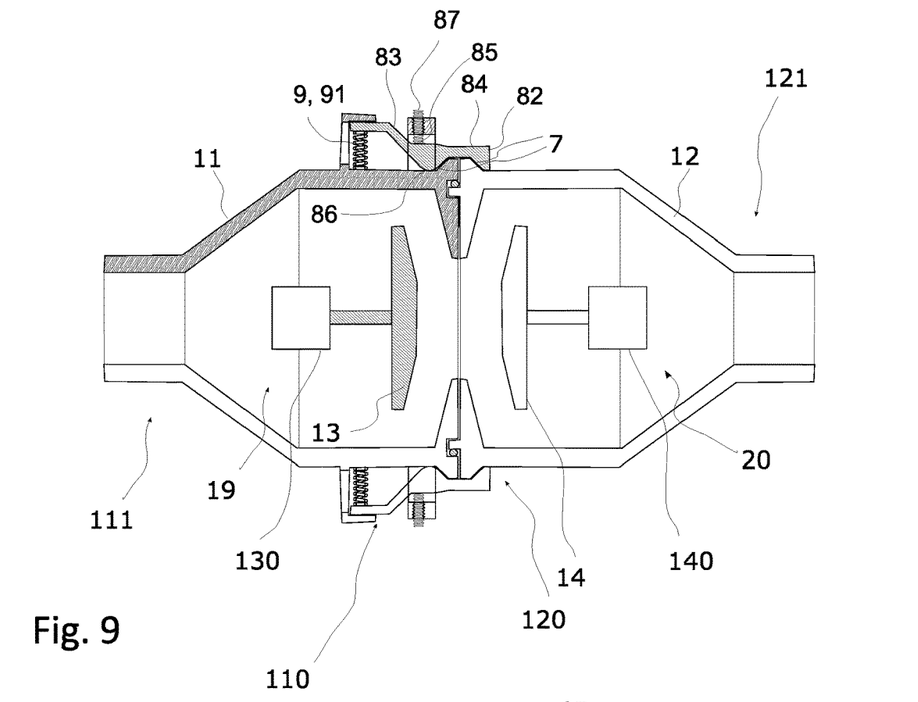
FIG. 9 shows a further embodiment of a coupling device having a plurality of spring-loaded coupling elements distributed in the circumferential direction of the coupling device.

FIG. 9 shows an example of a further and particularly preferred embodiment of a coupling device 1 according to the invention. This embodiment is generally based on the spring-loaded coupling elements 8 comprising levers 82, wherein the levers 82 are mounted pivotable against the spring load. In particular, the lever 82 may comprise a first, spring-loaded arm 83 and a second arm 84 effecting the coupling of the two coupling parts 11, 12.

As in the embodiment of FIGS. 7 and 8 and as shown in FIG. 9, the spring-loaded coupling elements 8 in the coupled together state of the coupling parts may be in contact with one or more coupling surfaces 7 and be movable against the spring load. In this case, the movement against the spring load is a pivoting movement. In particular, a pivoting movement of the lever 82 is effected with which the arm 84, depending on the design, moves radially inwardly or outwardly, preferably radially outwardly as shown. The mounting of the lever is such that the pivoting movement is made about a pivot point 85. It is particularly advantageous to configure the position of the pivot point in the radial direction in an adjustable manner.

Opposite the pivot point 85, the lever 82 has a support surface 86 by means of which the lever 81 is able to be supported on the coupling part when the lever is pivoted against the spring force in order to bring together the separate coupling parts 11, 12 and to couple them to each other. For the process of coupling together, the support surface thus forms the pivot point of the lever 82. The spring force is effected in this example by coil springs 91. However, other spring types are also conceivable, for example a spring washer similar to the exemplary embodiments of FIGS. 7, 6 which extends around the lever arms 83, or else gas compression springs or elastomeric springs.

Also, in turn, inclined coupling surfaces 7 are provided by which radially acting forces of the spring load are converted into axially acting forces, which hold the two coupling parts 11, 12 together at their coupling ends 110, 120, and wherein the coupling parts are bendable by a force acting transversely to the axial direction against the radially acting spring load by the coupling element 8 being moved in the radial direction against the spring load.

Figure 10:
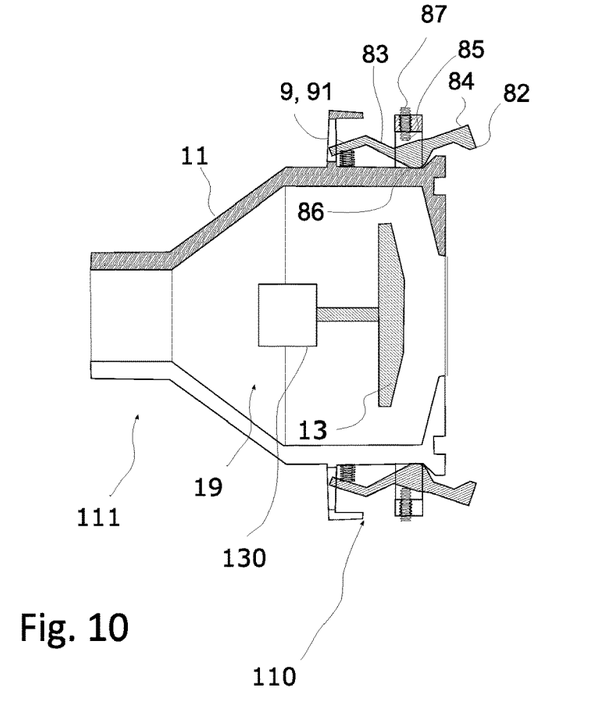
FIG. 10 shows a coupling part of the coupling shown in FIG. 9 with opened coupling elements.
Figure 11:
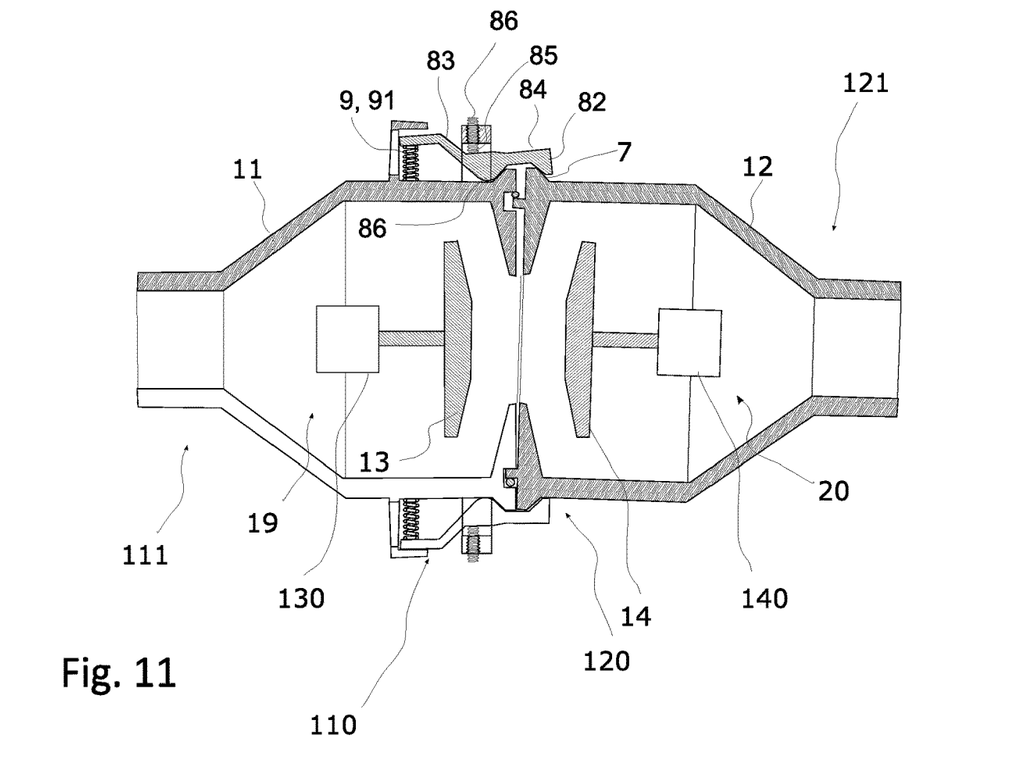
FIG. 11 shows the coupling device shown in FIG. 9 loaded with a bending moment.

FIGS. 10 and 11 illustrate the function of the coupling elements 8.

FIG. 10 shows the coupling part 11 with opened coupling elements 8, that is, with the levers 82 pivoted about the support surfaces 86 against the spring force of the coil springs 91.

In FIG. 11, analogously to FIG. 8, the coupling 1 is shown in a slightly bent state due to forces acting transversely to the forward direction, so that the axes of the coupling parts are at an angle to one another. By virtue of the coupling parts 11, 12 and, thus, also the inclined surfaces 7 on one side (in FIG. 11 above) being moved apart slightly by the transverse force, the lever arm 84 of the lever 82 is pivoted against the spring force acting on the other arm 83 about the pivot point 85. If the bending angle and, thus, also the pivoting of the lever 82 are even greater than shown, the coupling elements decouple from the inclined surfaces 7 and the coupling parts 11, 12 may detach from one another.

As can be seen from FIGS. 10 and 11, the longitudinal positions of the pivot point 85 and the point-of-support of the support surface 86 differ. In general, without being restricted to the specific exemplary embodiment, according to a further development provision is made for the coupling element 8 to comprise a lever 82, wherein the lever 82 is mounted such that it has two pivot axes which differ in the longitudinal position along the lever arms 83, 84, so that a pivoting by moving the coupling parts 11, 12 apart or bending them toward each other about a first pivot axis, and opening the coupling elements 8 for coupling the coupling parts 11, 12 is accomplished by pivoting about a second pivot axis. Accordingly, in the example shown in FIGS. 9 to 11, the first pivot axis runs through the pivot point, the second pivot axis through the point-of-support of the support surface 86 on the coupling part 11.

This has, among other things, the advantage that the position of the pivot axes, the length of the lever arms and the forces to be overcome when coupling or separating the coupling parts 11, 12 may thus also be influenced. In particular, a third lever arm may also be formed between the two pivot axes via which the lever 82 is pivotable by changing the radial position of the pivot point 85, so that the coupling element as shown in FIG. 10 is brought into a mounting position which permits the coupling parts 11, 12 to be brought together. In the illustrated embodiment, the pivot point 85 is formed by the end of a set screw 87. The adjusting screw 87 may now, as shown on the lower coupling element 8 in FIG. 10, be further screwed in, so that the pivot point 85 moves radially inwardly, thereby enabling the lever to pivot about the point-of-support of the support surface 86 and thereby move the lever arm 84 radially outwardly.

Figure 12:
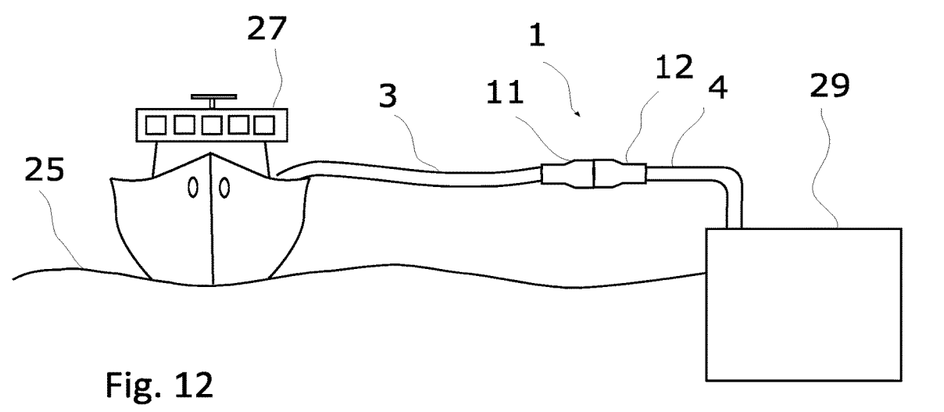
FIG. 12 shows as an application example, a coupling device for connecting a watercraft with an installation on land.

FIG. 12 shows a use case of a coupling device 1 according to the invention. Two lines 3, 4 are connected to each other via the coupling device 1. In this case, the one line 3 is connected to a watercraft 27, the other line 4 to an installation on land, such as a pier 29. The lines 3, 4 may serve, for example, to unload a cargo of the watercraft or to refuel the watercraft 27.

Figure 13:
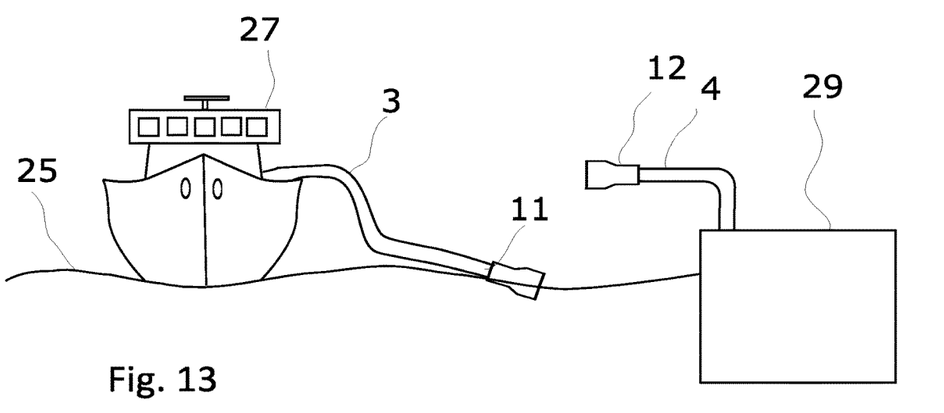
FIG. 13 shows the arrangement according to FIG. 10 with a separated coupling device.

Due to the sea state, bending loads may occur which are absorbed by a resilient movement of the coupling parts 11, 12, as shown in FIGS. 5 and 8. If, as shown in FIG. 13, an intended or even unintended opening of the coupling parts 11, 12 occurs, then a coupling part 11 which falls into the water during this operation can easily be recovered due to its buoyancy. A problem may also arise in particular if the coupling part without any buoyancy gets snagged under water, for example on anchor chains.

In the example shown in FIGS. 12 and 13, the land-side line 4 is rigid, or the land-side coupling part 12 is part of a rigid installation, so that the coupling part 12 cannot fall into the water even after an opening of the coupling device 1. In this case, it is not necessary for this coupling part 12 to be buoyant also.

Figure 14:
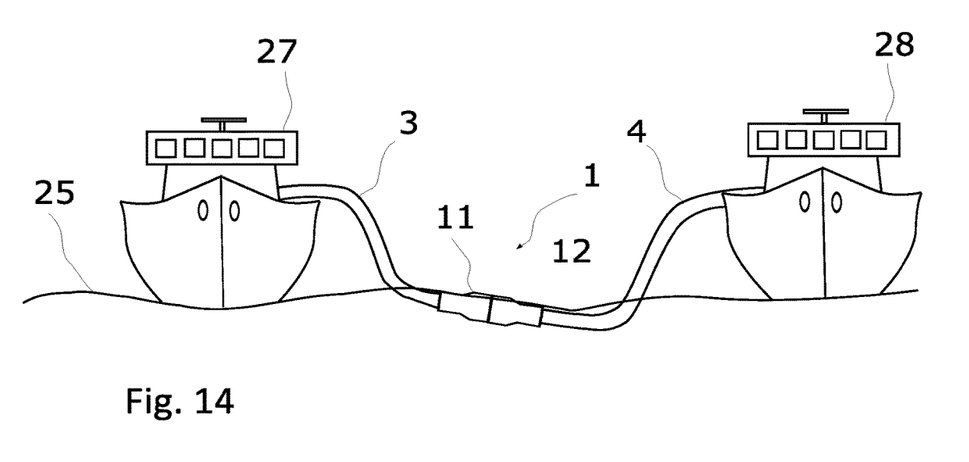
FIG. 14 shows a floating line connection and FIG. 15 shows a line arrangement with a coupling device under lateral force.

FIG. 14 shows another use case. In this case a floating line connection between two lines 3, 4 is provided with a coupling device 1 floating on the surface of the water. Because the coupling device 1 itself is buoyant despite its weight, the lines 3, 4 are not pulled under water and therefore are easily be recoverable.

In this case, the sea state acts directly via the lines 3, 4 also on the coupling device located between them and causes bending moments there. Larger bending moments are absorbed by the bending movement of the two coupling parts described here. If a limit value of the bending moment is exceeded, the coupling device is released by separation. Such a line connection may be used, for example, to convey liquid or gaseous fluids between two watercraft 27, 28 as shown.

The invention is generally particularly well suited to interconnect voluminous large diameter lines. Accordingly, the coupling device 1 preferably has a large diameter. Especially with such coupling devices and lines, the forces occurring in the sea state represent a problem because of possible material fatigue. The coupling device 1 preferably has a diameter of at least 30 cm, without being limited to the exemplary embodiments. Typical diameters of the fluid channel 6 in the coupling parts 11, 12 are according to one embodiment of the invention at least 8 inches, preferably at least 10 inches or even 12 inches and more.

Figure 15:
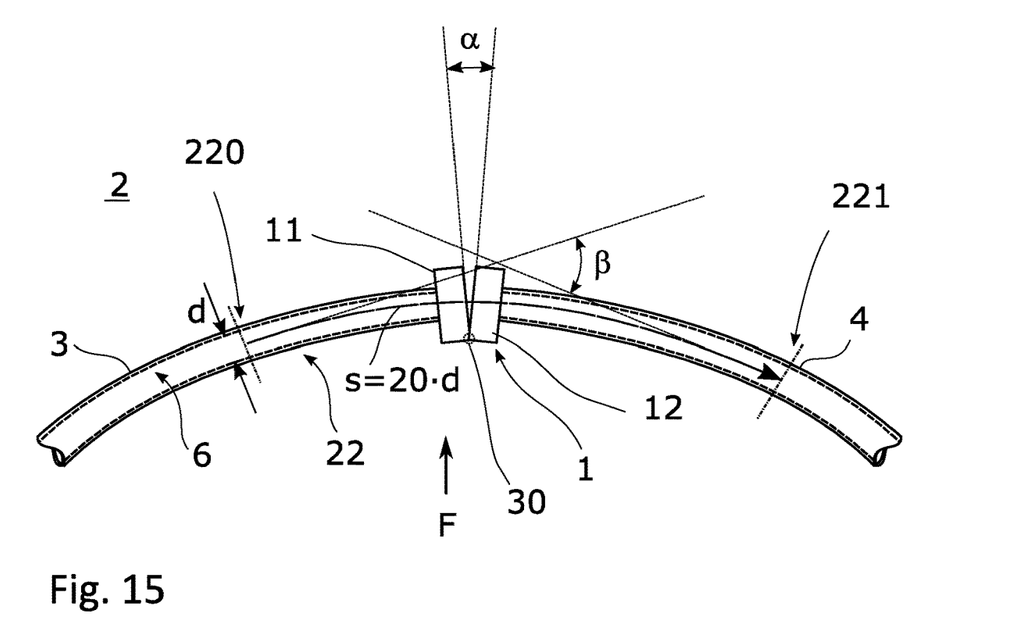

The flexibility of the coupling device 1 achieved by the invention is advantageous even if the lines 3, 4, which are connected to the coupling device, are not completely rigid. Especially with large line diameters, as in the aforementioned inner diameters of at least 8 inches, the lateral forces that may occur are substantial enough that they may lead to fatigue on a coupling device, if it is rigid and cannot withstand the shear forces. It is therefore generally of particular advantage when the coupling device provides flexibility that is greater than the flexibility of the line arrangement. This is achieved according to a further aspect of the invention, when, along a portion of the line arrangement comprising the coupling device 1, the ends of the section are deflected at an angle relative to a rectilinear arrangement when a transverse force is applied, the coupling device 1 being designed such that the angle by which the two coupling parts 11, 12 are deflected with respect to their axial direction make up more than half the angle of deflection of the ends of the section of the line arrangement. In other words, the coupling assembly 1 is designed such that when a transverse force is active, the deformation of the line arrangement is accomplished mainly by the bending of the coupling parts 11, 12. This ratio also depends in particular on the length of a line section with respect to its inner diameter. In a preferred embodiment, a line section may be considered that has twenty times the length of the inner diameter of the fluid channel 6 and includes the coupling device 1 as mentioned. For clarification, a line arrangement 2 is shown in FIG. 15 under the action of a lateral force F and deformation of a line section 22 produced thereby. The line section 22 is merely a notional part of the line arrangement 2 and has a length s which is substantially greater than the line cross section or the diameter d of the fluid channel 6 in one of the lines 3, 4. According to one embodiment, a line section 22 is considered which has twenty times the diameter d of the fluid channel 6, $s = 20 \ast d$. According to another embodiment, a fixed length line section 22 may also be considered. A suitable length is 8 meters.

The line arrangement 2 bends as a result of a laterally acting force F in the region of the line section 22. Accordingly, the tangents to the axial directions of the section ends 220, 221 of the line section 22 are at an angle $\beta$ to each other as shown. The restoring forces of the spring elements 9 of the coupling elements 8 are dimensioned such that the bending angle $\alpha$ caused by the lateral force F represents more than half of the angle $\beta$ of the line section 22, or the directions of the section ends 220, 221. Accordingly, the flexibility of the line section 22 for relieving the line arrangement from mechanical moments that occur is predominantly effected by the coupling device 1.

In summary, therefore, according to a further aspect of the invention, a line arrangement 2 is provided which comprises two lines 3, 4, preferably hose lines, which are interconnected by a coupling device 1 according to the invention, wherein the spring elements 9 of the coupling elements 8 of the coupling device 1 are designed so that in the event of a force laterally acting on a line section 22 force within which the coupling device 1 is arranged, the bending angle $\alpha$ between the coupling parts 11, 12 that is caused by the force F represents more than half of the angle $\beta$ between the longitudinal directions or the axial directions of the section ends 220, 221. In this case according to a first embodiment, the length of the line section 22 is given by twenty times the inside diameter of the fluid channel 6 of one of the lines 3, 4. According to another embodiment, the length is 8 meters.

With reference to FIG. 15, it can further be seen that the coupling device 1 is furthermore designed such that the pivot point 30 about which the coupling parts 11, 12 move when bent is generally and preferably outside the fluid channel 6. This is obviously also the case with the other embodiments shown in the figures. Such an arrangement is favorable, among other things, because it provides a simple structure and, on the other hand, causes a greater deflection on the spring element 9 situated opposite the acting force and, thus, a greater restoring force.

It will be apparent to those skilled in the art that the invention is not limited to the exemplary embodiments of the figures. In particular, the features illustrated in the figures may also be combined with each other. The spring elements 9 are shown, for example, as coil springs, but leaf springs, disc springs, elastomeric springs or pneumatic spring elements may also be used.

LIST OF REFERENCE NUMBERS

1 Coupling device
2 Line arrangement
3, 4 Line
5 Seal
6 Fluid channel
7 Deformable connecting element
8 Coupling element
9 Spring element
11, 12 Coupling part
13, 14 Sealing device
16, 17 Buoyancy body
19, 20 Cavity
25 Water surface
27, 28 Watercraft
29 Pier
30 Pivot point
81 Abutment
82 Lever
83, 84 Lever arms
85 Swivel point
86 Support surface
87 Adjusting screw
90 Spring washer
91 Coil spring
100 Axial direction, longitudinal direction
101 Axial direction, longitudinal direction from 12
110, 120 Coupling end
111, 121 Connection end
130, 140 Drive device for 13, 14
220, 221 Section ends

The invention claimed is:

1. A coupling device for joining two lines, the coupling device comprising:
   a first coupling part for a first one of the two lines;
   a second coupling part for a second one of the two lines;
   at least one buoyancy body mounted on an outside of one or both of the first and second coupling parts for making one or both of the first and second coupling parts buoyant per se;
   at least one coupling element;
   at least one spring element for spring-loading the at least one coupling element; and
   at least one seal;
   wherein the at least one coupling element and the at least one spring element are operative for:
      coupling the first and second coupling parts together to join the two lines;
      allowing the first and second coupling parts to bend relative to each other with respect to a normal position by forces acting laterally with respect to an axial direction of the coupling device;
      when the first and second coupling parts are in a bent position, exerting a restoring force on the first and second coupling parts in the direction of the normal position;
      allowing the first and second coupling parts to move apart a certain distance by a force acting in the axial direction of the coupling device;
      when the first and second coupling parts are moved apart up to the certain distance, exerting a restoring force on the first and second coupling parts in the direction of the normal position; and
      allowing the first and second coupling parts to bend relative to each other or move apart until the first and second coupling elements decouple and separate from one another after exceeding the certain distance or exceeding a bending angle of at least 0.5 degrees, thereby unjoining the two lines; and wherein the first and second coupling parts are sealed from the environment with the at least one seal when the first and second coupling parts remain coupled together.

2. The coupling device according to claim 1, wherein at least one of the first and second coupling parts when the coupling device in the coupled together state of the first and second coupling parts, is buoyant in water.

3. The coupling device according to claim 1, wherein at least one of the first and second coupling parts has at least one coupling surface running at an incline with respect to the axial direction of the coupling device, and wherein the at least one coupling element and the at least one spring element for spring-loading the at least one coupling element comprise circumferentially distributed spring-loaded coupling elements which in the coupled together state of the first and second coupling parts are in contact with one or more coupling surfaces and are movable or pivotable in the radial direction against the spring load, and wherein, due to the inclined coupling surface, radially acting forces of the spring load are converted into axially acting forces, which hold the first and second coupling parts together at their coupling ends, and wherein the first and second coupling parts due to a force acting transversely with respect to the axial direction are deflectable against the radially acting spring load in that the spring-loaded coupling elements are moved in the radial direction against the spring load.

4. The coupling device according to claim 3, wherein the spring-loaded coupling elements have surfaces corresponding to the coupling surface and inclined with respect to the axial direction, so that, when there is an axial separation movement of the first and second coupling parts and a radial movement of the spring-loaded coupling elements imparted thereby, the corresponding surfaces of the spring-loaded coupling elements and the coupling surface slide past each other.

5. The coupling device according to claim 1, wherein the at least one spring element comprises an extensible spring washer.

6. The coupling device claim 1, wherein the spring-loaded coupling elements comprise levers, wherein the levers are mounted as to be pivotable against the spring load.

7. The coupling device according to claim 6, wherein the levers are mounted such that their pivotal movement is about a pivot point, the position of which is adjustable in the radial direction.

8. The coupling device according to claim 6, wherein at least one of the levers is mounted such that it has two pivot axes which differ in the longitudinal position along a lever arm, so that a pivoting is accomplished by moving the first and second coupling parts apart or bending them relative to each other about a first pivot axis and opening of the spring-loaded coupling elements for coupling together the first and second coupling parts by pivoting about a second pivot axis.

9. The coupling device according to claim 1, wherein the first and second coupling parts each have a cavity open toward the coupling end and a sealing device, wherein the sealing device is formed such that it seals the cavity from the environment when the first and second coupling parts are separated.

10. The coupling device according to claim 1, wherein each of the first and second coupling parts is buoyant per se.

11. The coupling device according to claim 1, wherein both the first and second coupling parts have one of the at least one buoyancy body.

12. The coupling device according to claim 1, wherein the two lines are fluid lines, power lines, or signal lines.

13. The coupling device according to claim 1, wherein the coupling device is made of metal.

14. The coupling device according to claim 1, wherein the coupling device has a diameter of at least 30 cm.

15. The coupling device according to claim 1, wherein the coupling device is designed as a safety disconnect coupling which disconnects when a predetermined mechanical tensile load limit is exceeded in order to prevent the connected lines from rupturing.

16. The coupling device according to claim 1, further comprising a fluid channel in the first and second coupling parts having a diameter of at least 8 inches.

17. A floating line connection between two lines comprising a coupling device according to claim 1 floating on a surface of water.

18. A line arrangement comprising:
first and second lines joined by a coupling device, the first and second lines joined by the coupling device defining a line section having opposing ends, the coupling device disposed within the line section, the coupling device comprising:
a first coupling part for the first line;
a second coupling part for the second line;
at least one coupling element; and
at least one spring element for spring-loading the at least one coupling element;
wherein the at least one coupling element and the at least one spring element are operative for:
coupling the first and second coupling parts together to join the first and second lines;
allowing the first and second coupling parts to bend relative to each other with respect to a normal position by forces acting laterally with respect to an axial direction of the coupling device;
when the first and second coupling parts are in a bent position, exerting a restoring force on the first and second coupling parts in the direction of the normal position;
allowing the first and second coupling parts to move apart a certain distance by a force acting in the axial direction of the coupling device;
when the first and second coupling parts are moved apart up to the certain distance, exerting a restoring force on the first and second coupling parts in the direction of the normal position; and
allowing the first and second coupling parts to bend relative to each other or move apart until the first and second coupling elements decouple and separate from one another after exceeding the certain distance or exceeding a bending angle, thereby unjoining the two lines;
wherein the at least one spring element is configured such that, when a force acts laterally on the line section, the bending angle between the coupling parts caused by the force is more than half of an angle between longitudinal directions of the opposing ends of the line section; and
wherein a length of the line section is:
twenty times an inner diameter of a fluid channel of one of the first and second lines; or 8 meters.

* * * * *